(12) United States Patent
O'Brien et al.

(10) Patent No.: US 7,416,316 B2
(45) Date of Patent: Aug. 26, 2008

(54) STRUT HOLDING ASSEMBLY

(75) Inventors: Finn M H O'Brien, Brooklyn, NY (US); David Conroy, Brooklyn, NY (US)

(73) Assignee: Lowel-Light Manufacturing, Inc., Brooklyn, NY (US)

( * ) Notice: Subject to any disclaimer, the term of this patent is extended or adjusted under 35 U.S.C. 154(b) by 99 days.

(21) Appl. No.: 11/567,582

(22) Filed: Dec. 6, 2006

(65) Prior Publication Data

US 2008/0137352 A1    Jun. 12, 2008

(51) Int. Cl.
*F21V 19/00* (2006.01)
(52) U.S. Cl. .............................. 362/382; 362/7; 362/10; 362/18; 362/432
(58) Field of Classification Search ................. 362/382, 362/18, 7, 3, 10, 16, 432, 430, 450; 396/1, 396/4, 5
See application file for complete search history.

(56) References Cited

U.S. PATENT DOCUMENTS 4,202,363 A * 5/1980 Watts et al. ................... 135/98
6,030,087 A * 2/2000 Whittle ......................... 362/18
6,076,935 A * 6/2000 Kester .......................... 362/16
6,176,598 B1 * 1/2001 Seligman et al. ............ 362/352

* cited by examiner

*Primary Examiner*—Ali Alavi
*Assistant Examiner*—Evan Dzierzynski
(74) *Attorney, Agent, or Firm*—Notaro & Michalos P.C.

(57) ABSTRACT

A strut holding assembly for flexible elongated struts engaging a flexible wall, the assembly including a hub, a plurality of holding arms pivotally connected at spaced locations to the hub between storage positions adjacent the hub, and extended positions extending outwardly of the hub, each holding arm being adapted to immobilize a free inner end of one strut. At least one of the holding arms has a seat adapted for receiving and immobilize the free inner end of a strut in at least one direction and a hook spaced from the seat by a fulcrum distance, the hook being adapted for engaging the strut at a distance from the free inner end of the strut equal to the fulcrum distance, for immobilizing the strut in a bent and tensioned position and in at least three directions and being free to move in a remaining direction.

27 Claims, 10 Drawing Sheets

STRUT HOLDING ASSEMBLY

FIELD AND BACKGROUND OF THE INVENTION

The present invention relates generally to the field of supports for flexible struts or rods that, in turn, support flexible walls, such as the flexible walls of an umbrella-type reflector, soft box, light dome or the like, for photographic and other image capture purposes, or the flexible walls of enclosures such as tents, canopies or the like.

Patents that have been found to be pertinent, include the following:

| U.S. Pat. No. | Inventor(s) |
| --- | --- |
| 4,750,509 | Kim |
| 4,981,387 | Younjae |
| 5,328,286 | Lee |
| 6,030,087 | Whittle |
| 6,076,935 | Kester |
| 6,176,598 | Seligman, et al. |
| 6,296,415 | Johnson, et al. |
| 6,604,844 | Hussey |
| 6,709,121 | Lowe, et al. |
| 7,077,534 | Harlocker. |

U.S. Pat. No. 6,709,121 to Lowe, et al. discloses a rod mount for a support rod of a light bank. The rod mount is pivotally attached to a ring-shaped frame of the light bank, and includes at least one hole for receiving and retaining one end of the support rod.

U.S. Pat. No. 6,176,598 to Seligman, et al. discloses a strut holder tube for receiving and retaining the flexible strut of a reflector or soft box. The strut holder tube is pivotally mounted on a tube support. In the extended position, the strut holder tube extends radially outward from the tube support.

U.S. Pat. No. 6,030,087 to Whittle discloses a light reflector with radial ribs which are pivotally connect to an armature of the light reflector. The reflector is deployed by pivoting and locking the ribs in their extended position.

U.S. Pat. No. 6,076,935 to Kester discloses a photographic lighting dome with a plurality of flexible support rods and a housing of flexible material. The lighting dome includes a central hub with insertion sockets for receiving and retaining the support rods.

U.S. Pat. No. 6,296,415 to Johnson, et al. discloses a cam style hub for engaging multiple flexible support struts an one time when the hub is rotated.

A need remains for a strut holding assembly, and, in particular, a strut holding arm of such an assembly, which can more easily be engaged to the inner free end of a strut for holding a flexible wall, the strut being moved into and held in a bent, tensioned position for holding the flexible wall in a use position.

SUMMARY OF THE INVENTION

The invention is a strut holding device for use in combination with a flexible elongated strut that is engaged to a flexible wall and that has a bent and tensioned position for holding the flexible wall in a use position when a free end of the strut is immobilized.

The assembly comprises a plurality of holding arms pivotally attached to a support hub. The holding arms are preferably (although not necessarily) equally spaced about the hub. When the pivotally attached holding arms are deployed, or, as is always the case for the holding arms that are fixed to the hub, the holding arms extend substantially perpendicularly and outwardly from the periphery of the hub. In the stowed or storage position for the pivotally attached holding arms (after removing the struts or before installing them), the holding arms are folded rearwardly. The hub may include a mounting assembly for a light fixture and/or for attaching the hub to a tripod or an elevating support structure. The length and flexibility of the strut and the number and position of the holding arms may be varied to produce a flexible wall with the desired geometric shape such as a dome, sphere, hemisphere, pyramid, prism, etc, or even a two dimensional wall where only two struts are used.

The holding arm includes a seat adapted for receiving and for immobilizing the free end of the strut in at least one direction (e.g. the radial direction toward the support hub), and a hook spaced from the seat by a fulcrum distance. The hook is adapted to engage the strut at a distance from the free end of the strut equal to the fulcrum distance and for immobilizing the strut in its bent, tensioned position, although the strut may still rotate about its axis.

The seat and hook are fixed with respect to each other, and the holding arm includes a passage between the seat and hook to permit passage of the strut as it is bent into its tensioned position with the free end of the strut immobilized in the seat.

The free end of the strut may be provided with an optional enlarged plug to conform to industry standards if desired.

According to one aspect of the invention, the holding arm has a U-shaped passage. A hinged member is attached to one of the side walls of the passage at the distal end (or at the fulcrum distance). In its normal position, the hinged member extends between the side walls of the passage to form a strut retaining loop. To connect the strut to the holding arm, the strut is bent into its tensioned position with the free end of the strut immobilized in the seat, and pushed intothe strut retaining loop by displacing the hinged member inward (i.e. into the passage). The hinged member is allowed to return to its normal position to retain the strut within the strut retaining loop. To release the strut from the holding arm, the strut is pushed away from the hinged member (e.g. inwardly into the passage), the hinge member is displaced into the passage, and the strut is guided out of the passage.

The desired degree of tension and/or curvature of the strut in its tensioned deployed state may be attained by adjusting either the fulcrum distance or the vertical distance between an axial line running through the center of the seat and the point of contact of the strut on the hook, or both.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
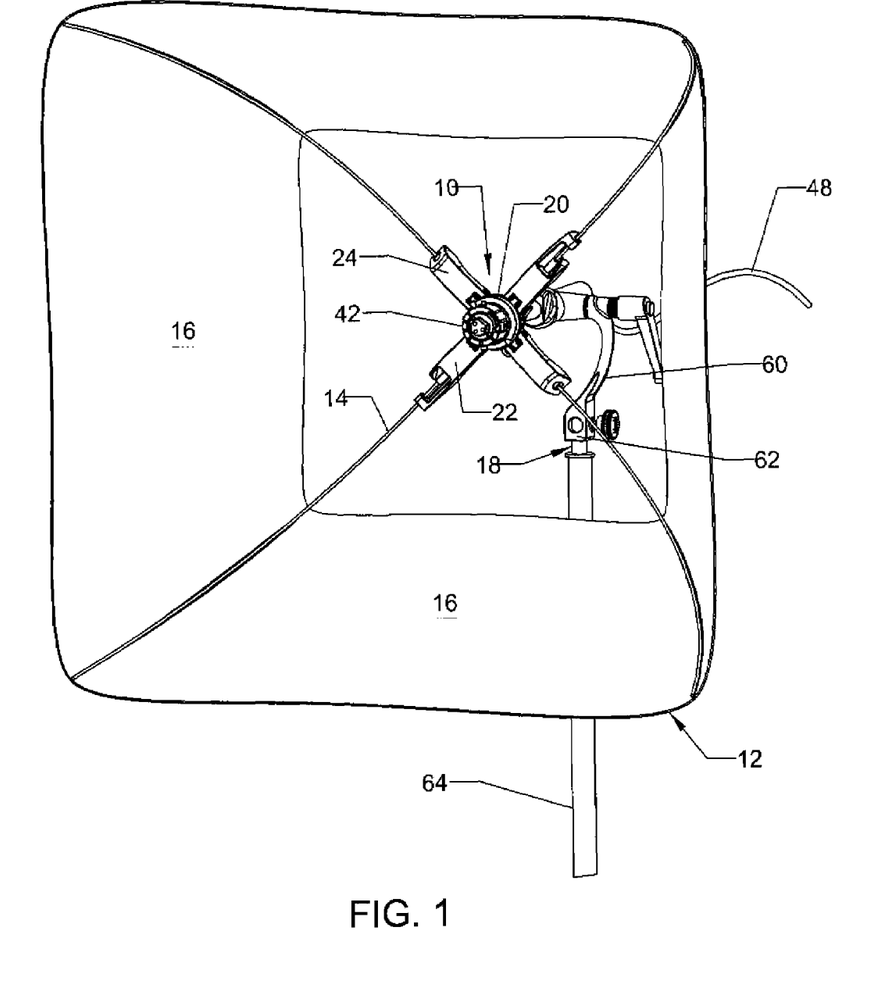
FIG. 1 is a front perspective view of a strut holding assembly or device of the present invention, in a use position for a flexible wall forming a soft box for a light fixture to be used with the invention.
Figure 2:
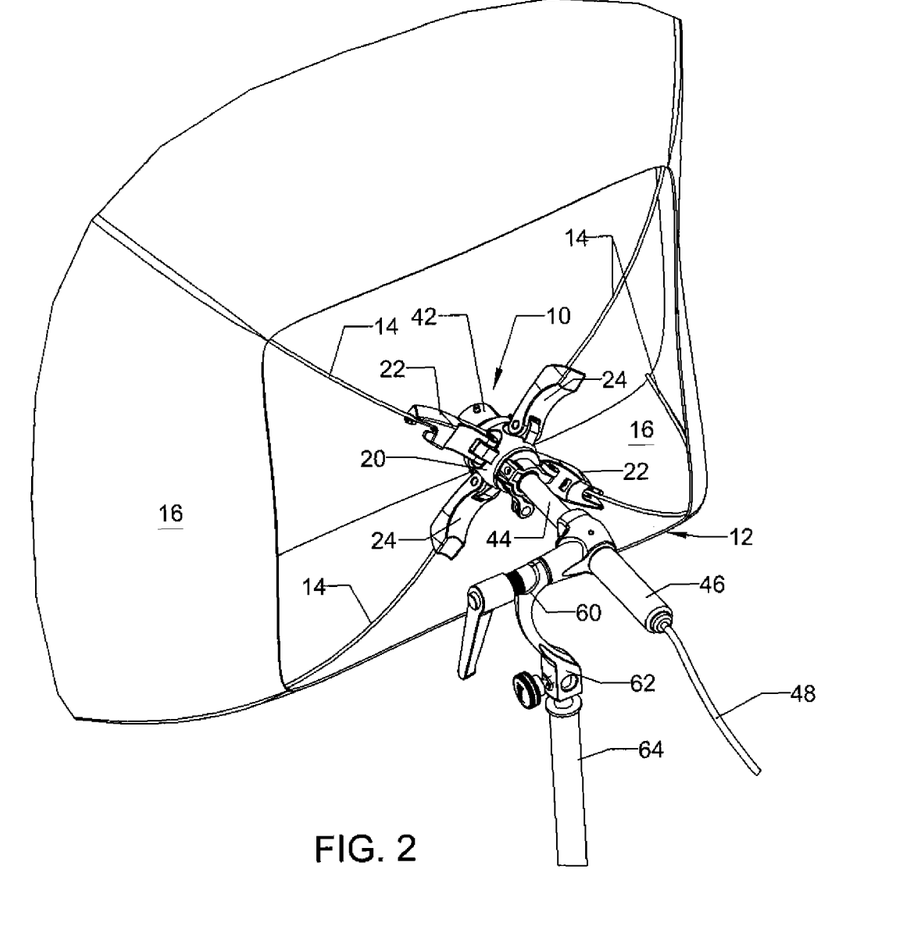
FIG. 2 is a partial, enlarged, rear perspective view of the embodiment of FIG. 1.

Referring now to the drawings, in which like reference numerals are used to refer to the same or similar elements, FIGS. 1 and 2 show a strut holding assembly 10 for use in combination with a plurality of flexible elongated struts 14 that are engaged to a flexible wall 16 and that each have a bent, tensioned position for holding the flexible wall in a use position shown in FIGS. 1 and 2, when a free inner end of each strut is immobilized by the assembly of the invention. Struts 14 with the flexible wall 16 form a soft box, for example.

A hub 20 of one embodiment of the invention has an axial opening that receives the support shaft 44 of a light fixture 42 having a rear end 46 to which a power cord 48 extends for powering a light source such as a lamp of other light emitting device (not shown) that is engaged to the light fixture 42. A mounting bracket 60 embracing shaft 44 can be fixed at a desired location along the shaft 44, and includes a stand engaging part 62 for receiving the top end of a stand 64 for supporting the light fixture and soft box. See the above-identified U.S. Pat. No. 6,176,598 to Seligman, et al., which is incorporated here by reference, for additional details.

Figure 3:
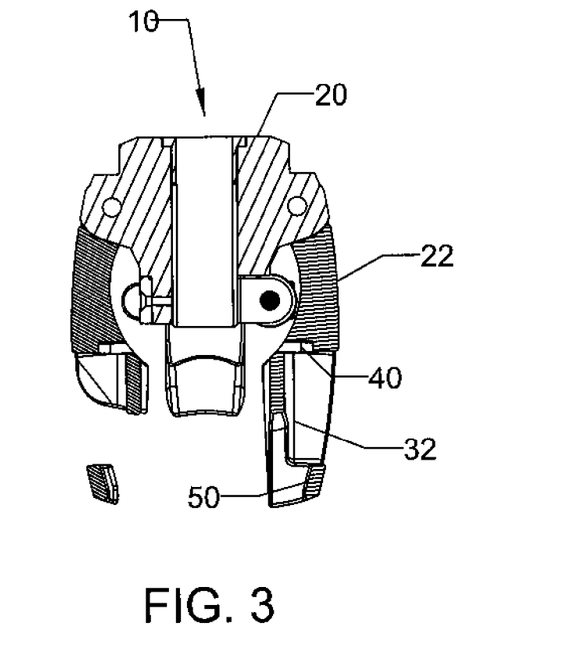
FIG. 3 is a sectional view of a hub and two holding arms of the assembly, in a storage position.
Figure 4:
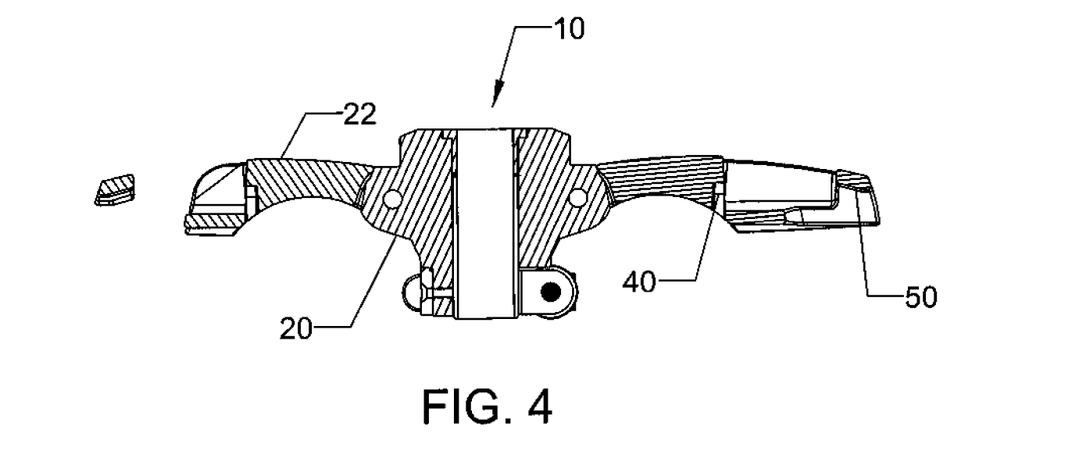
FIG. 4 is a view similar to that of FIG. 3 but with the arms in their extended position.

A plurality of holding arms 22 and 24 are pivotally connect at spaced locations around the hub 20, between folded storage positions shown in FIG. 3, adjacent the hub 20, and extended positions shown in FIG. 4, extending radially outwardly of the hub. In the positions of FIG. 4 the arms cannot pivot any further forward (i.e. to the top in FIG. 4) due to the shape of the base of each arm at its pivot hinge, and the shape of the projection or ear that extends radially from the hub. Again, see the above-identified U.S. Pat. No. 6,176,598 to Seligman, et al., for additional details.

Each holding arm is adapted to immobilize the free inner end of one strut 14 with respect to the hub, and thereby mount the soft box to the light fixture.

In the embodiment of FIGS. 1 and 2, two of the arms 24, 24 are designed in a similar fashion to those of U.S. Pat. No. 6,176,598, so that each inner free end of a respective strut 14 is radially plugged into a radially extending blind bore of the arm to hold these struts in their tensioned positions. If all of the holding arms are of this blind bore design, however, it was found to be difficult to engage the remaining struts.

Figure 5A:
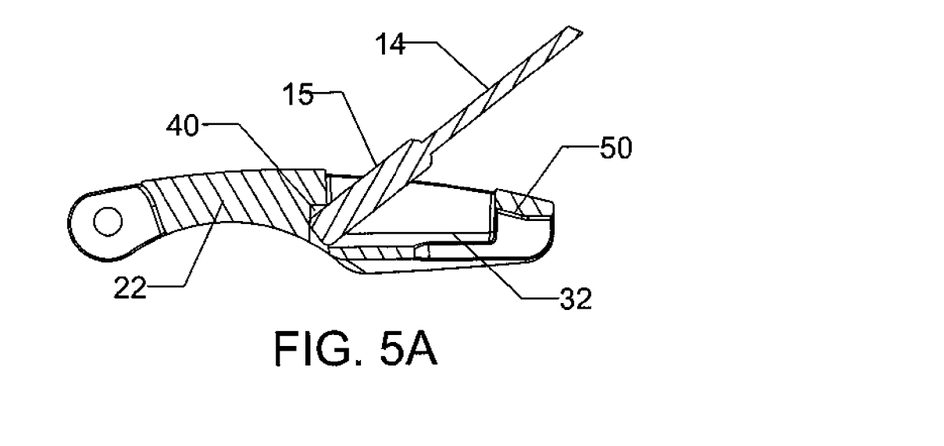
FIG. 5A is a sectional view of the holding arm of the invention during an initial step for engaging a strut end to the arm.
Figure 5B:
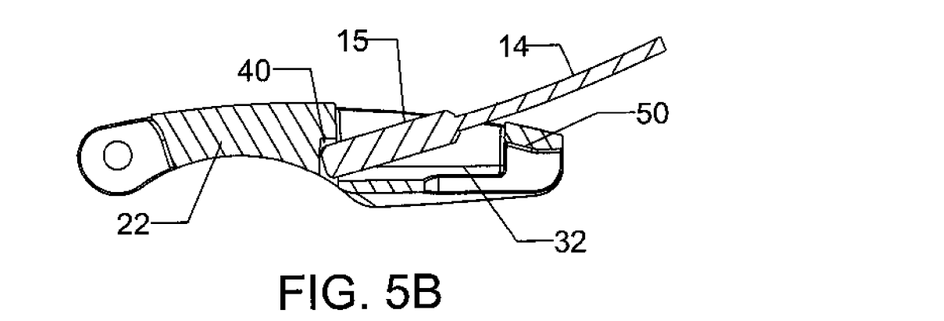
FIG. 5B is a view similar to FIG. 5A of an intermediate step in the engagement process.
Figure 5C:
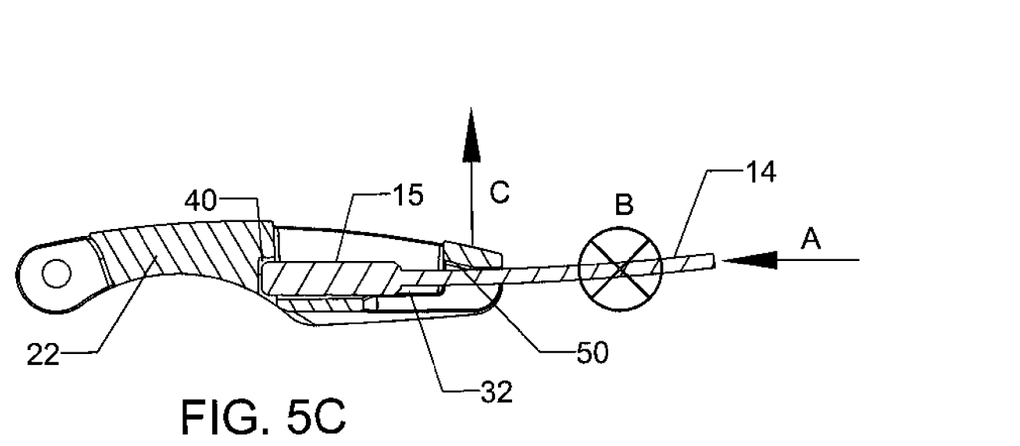
FIG. 5C is a view similar to FIG. 5A of a final step in the engagement process.
Figure 6A:
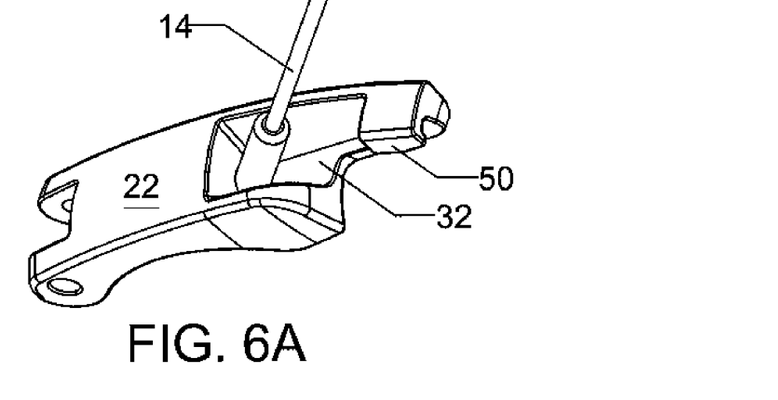
FIG. 6A is a perspective view of the arrangement and position of FIG. 5A.
Figure 6B:
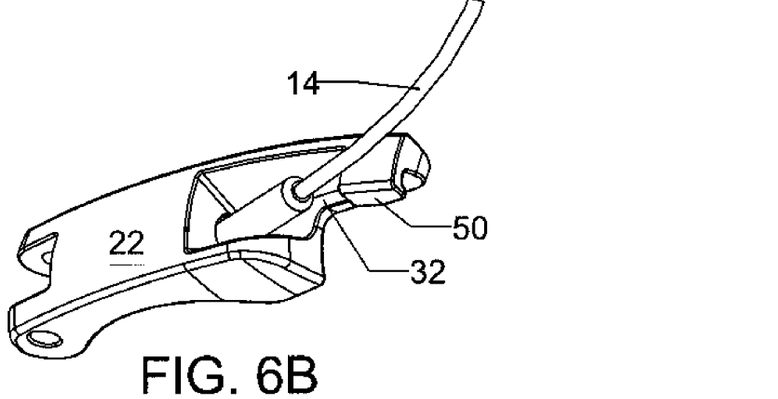
FIG. 6B is a view similar to FIG. 6A of the intermediate step in the engagement process.
Figure 6C:
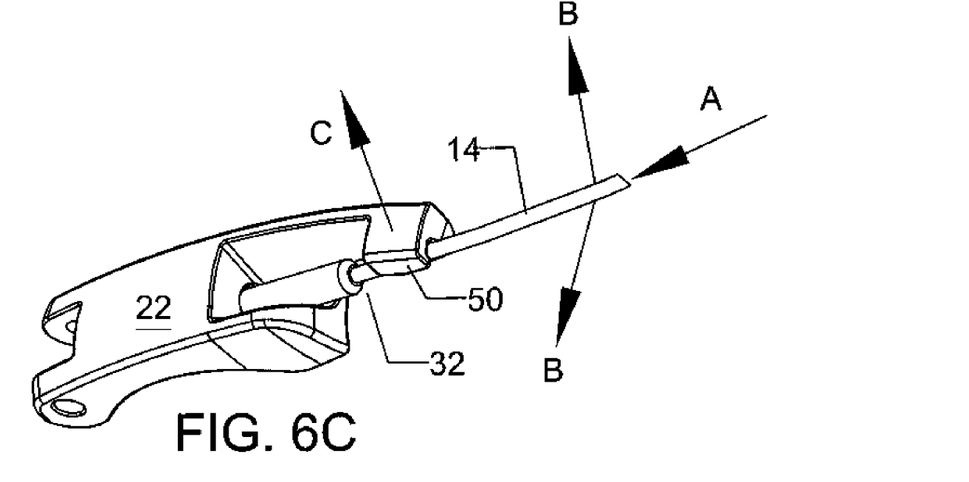
FIG. 6C is a view similar to FIG. 6B but of the final step in the engagement process.

According to the present invention, in order to allow the remaining struts to more easily be engaged to the remaining holding arm or arms, at least one of the holding arms 22, and, in the embodiment shown, two of the arms each comprise a seat 40 adapted to receive and immobilize the free inner end 15 of a strut 14 in at least one direction, i.e. in a radially inward direction of the hub 20 shown at arrow A in FIGS. 5C and 6C.

Figure 7:
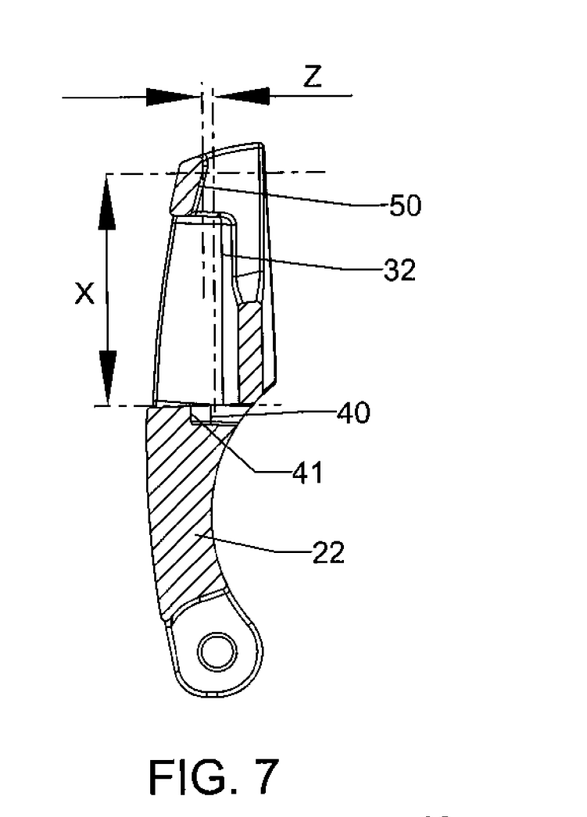
FIG. 7 is a sectional view of the holding arm on an enlarged scale to better show details of the invention.

Holding arms 22 each also include a hook 50 spaced from the seat by a fulcrum distance X, best shown in FIG. 7, the hook 50 being adapted for engaging the strut 14 at a distance from the free inner end 15 of the strut equal to the fulcrum distance, for immobilizing the strut in its bent, tensioned position. Hook 50 is shaped to immobilize this part of strut 14 in at least three directions of the total of six directions that are possible among the three orthogonal directions available, i.e. the plus and minus x direction, the plus and minus y direction and the plus and minus z direction. The three immobilization directions are, in the example shown, in a forward axial direction of the hub (that is to the left in FIG. 1 or along arrow C in FIGS. 5C and 6C), and in the clock-wise and counter-clockwise circumferential directions of the hub (i.e. double arrow B in FIGS. 5C and 6C). Strut 14 can still move in the one remaining directions, however, namely in the rearward axial direction, opposite to that of arrow C.

Figure 8:
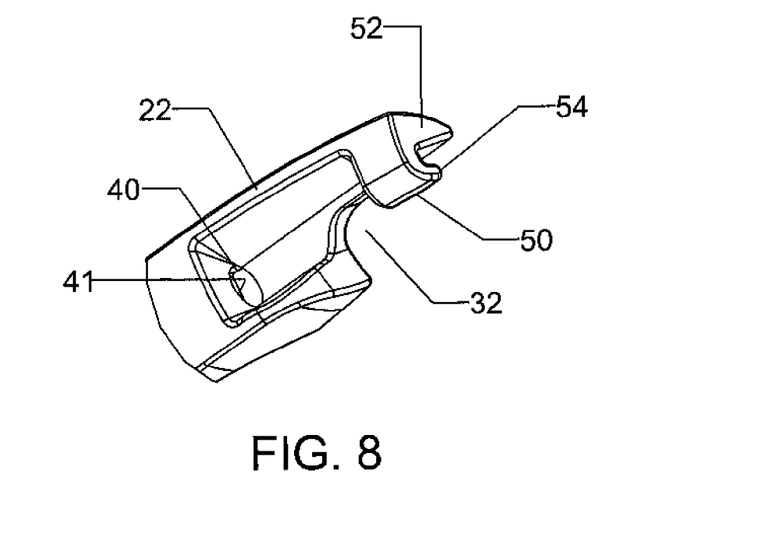
FIG. 8 is a partial perspective view of the holding arm of the present invention that is also on an enlarged scale to better show details of the invention.

The immobilization in the forward axial direction C is achieved by the fact that hook 50 extends over the strut 14 at the fulcrum distance X from the seat 40. The immobilization in the circumferential directions B around hub 20 is achieved, as shown in FIG. 8, because hook 50 is connected to the rest of the holding arm 22 by a bridge 52 at one side of the hook 50, and because hook 50 includes an axial projection 54 at its opposite side. In order to allow the strut 14 to leave hook 50 therefore the strut must first be moved in the rearward axial direction (opposite to arrow C) then moved in the clock-wise circumferential direction (the downward end of arrow B in FIG. 6C) and, thereafter, lifted, or allowed to move due to its our resilience, in the forward axial direction (arrow C).

In order to engage the struts 14 to each of the one or more holding arms 22, and referring now to FIGS. 5A and 6A, the free inner end 15 of the strut is pushed into the seat 40. Seat 40 is substantially cylindrical as shown also in FIG. 8 and may include an overhang 41 so that the end 15, which is shown to have a larger diameter than the rest of strut 14 but can be of the same diameter, is, in effect, plugged into the seat 40. This immobilizes the strut along its axis but allows the strut to rotate toward the arm as shown in FIGS. 5B and 6B.

The strut is then moved around the top of the hook 50 while its end 15 remains in seat 40, through a passage 32 between the seat and the hook for allowing passage of the strut, under the hook 50 as shown in FIGS. 5C and 6C, and into its bent and tensioned position with the free inner end of the strut immobilized in the seat.

Since the holding arm is preferably, but not necessarily a one-piece cast or machined member of metal or strong rigid plastic, the seat and hook are fixed with respect to each other.

Also, since the holding arms 22 with their complex seat and hook arrangement are more expensive to make than the blind bore holding arms 24, and further, since it was found that only one or two of the arms need to be of this more complex structure to still make it much easier to engage the soft box to the light fixture, according to the invention, fewer than all the arms need be of the more complex type.

The light fixture 42 connected to the hub 20 for carrying a light source for shining light can thus have its light modified by the flexible wall 16 engaged to the struts 14 in their tensioned positions.

It has also been found that according to the present invention, the fulcrum distance X and/or a vertical distance Z (FIG. 7) between a center of the seat 40 and a point of contact of the strut 14 in the hook 50 can be selected to set the degree of tension or bending of the strut 14 in its tensioned state.

Figures 9, 10:
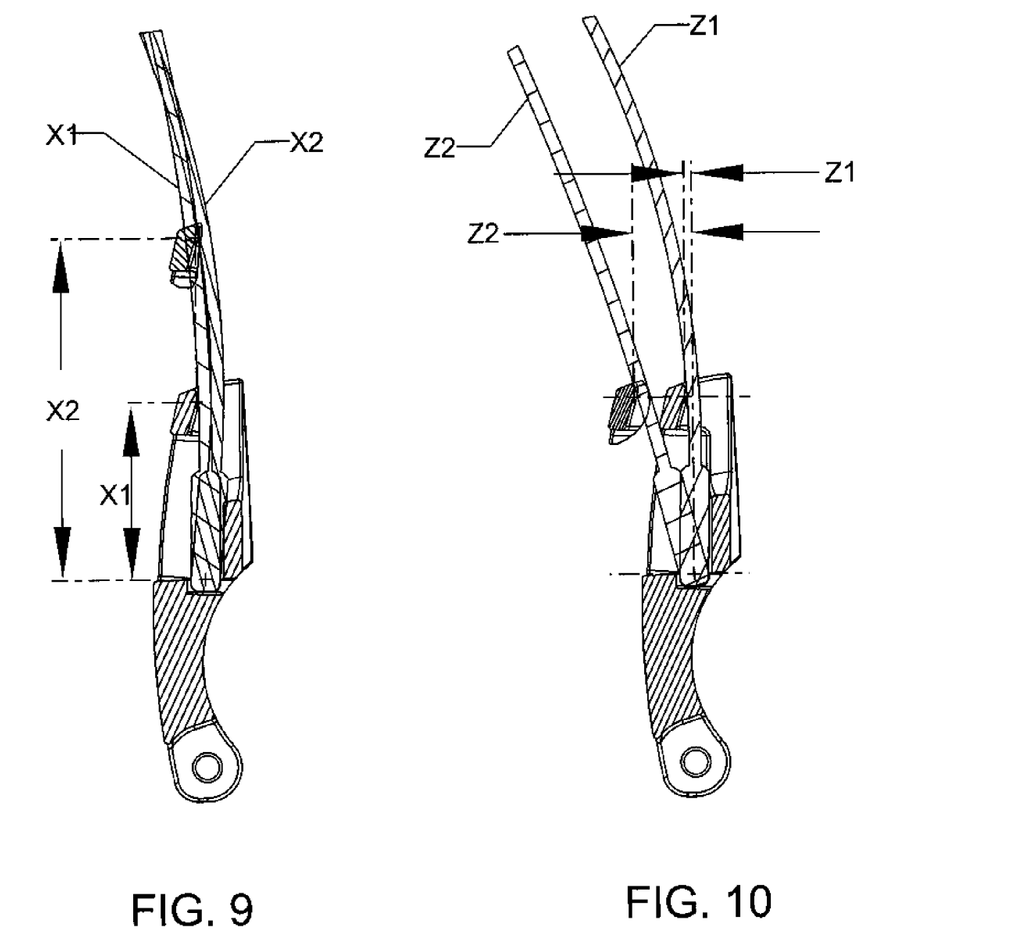
FIG. 9 is a composite view illustrating how changing the fulcrum distance for the hook, changes the nature of the tensioned position for the strut.
FIG. 10 is a composite view illustrating how changing the vertical distance for the hook, changes the nature of the tensioned position for the strut.

FIG. 9 shows how varying the fulcrum distance X from a longer distance X2 to a shorter distance X1 changes the bend and therefore the tension in the strut 14. FIG. 10 shows how varying the vertical distance Z from a large positive distance Z2 to a shallow or zero distance Z1 changes the bend and therefore the tension in the strut 14.

Figure 11:
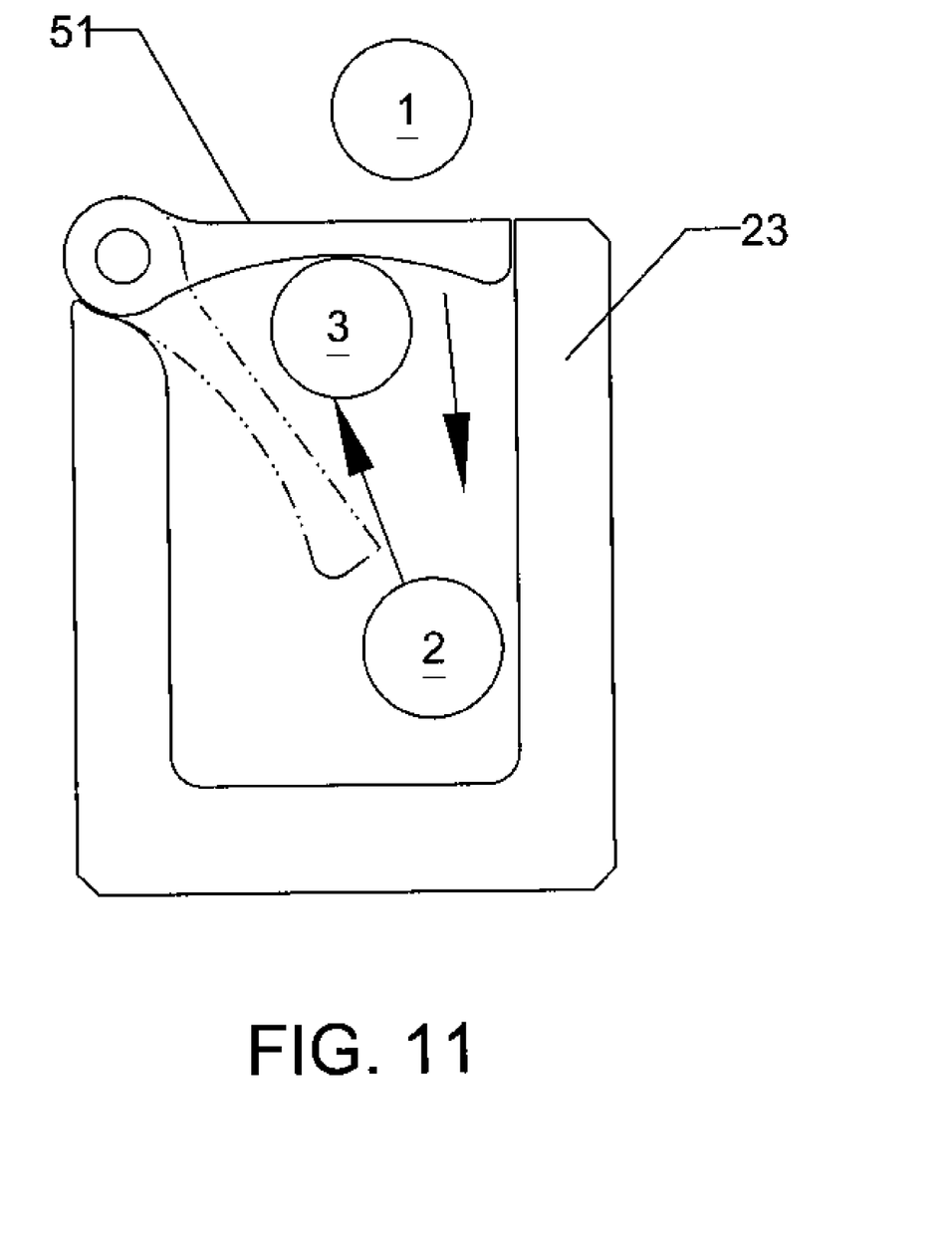
FIG. 11 is an end view of an alternate embodiment of the arm and hook which acts like a hinged gate for receiving a strut.

FIG. 11 illustrates an embodiment of the invention where the hook is formed by a spring-loaded gate 51 pivotally mounted to the holding arm 23 between a closed position shown in solid line for covering a passage into the arm, and an open position shown in phantom line for admitting a strut 14. Strut 14 starts in a position 1 outside the arm and hook, is pushed into a position 2, pushing the gate open and moving deep enough into the arm to allow the gate to close again over the strut and under the bias of its spring, and then strut 14 is released to rise under the influence of its our resiliency, into position 3, inside the hook and under the gate 51. To disengaged the strut, gate 51 is pushed open, e.g. using a finger, while strut 14 is moved into position 2. While still holding gate 51 open, strut 14 is allowed to exit the arm.

Figure 12:
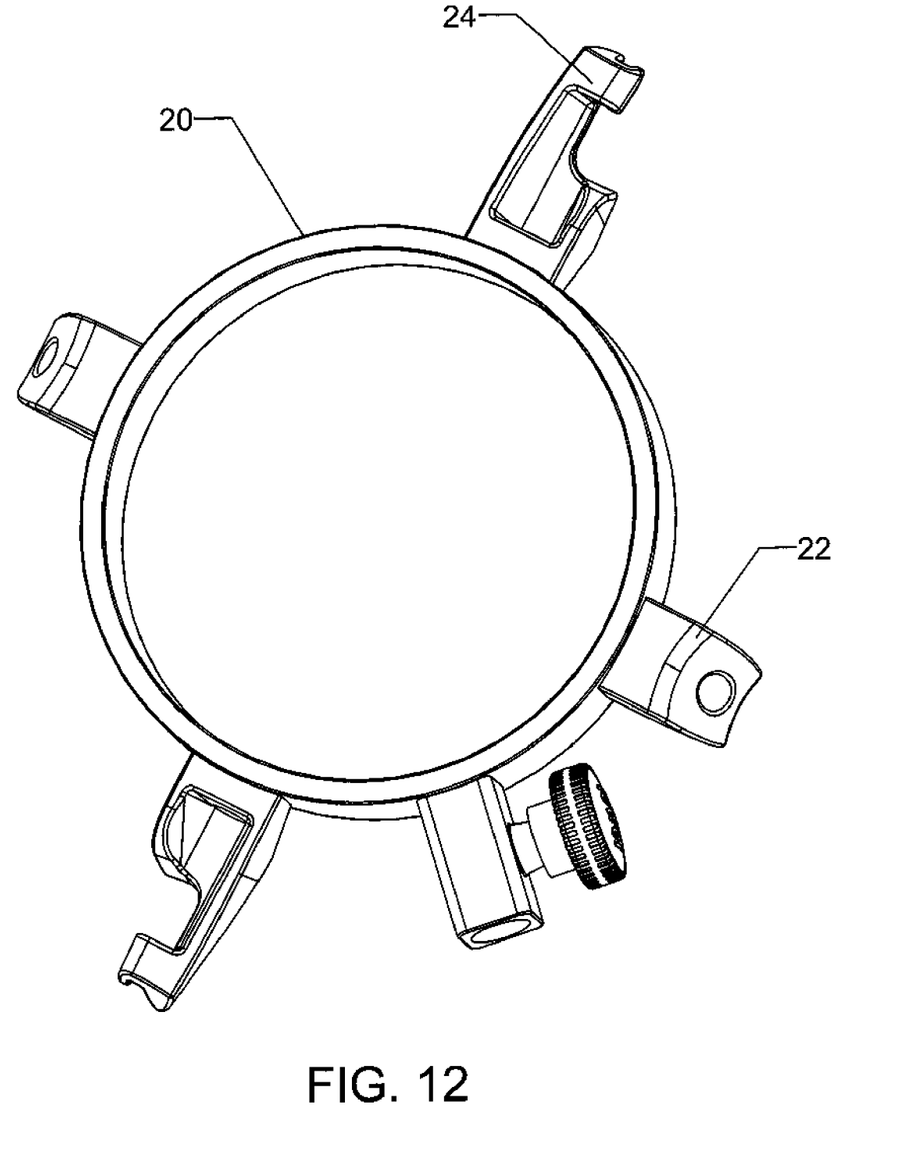
FIG. 12 is a perspective view of another embodiment of the strut holding device of the invention.

FIG. 12 illustrates an embodiment of the invention where the strut holding device has one or more holding arms that are fixed to a ring forming the hub, a sleeve with set screw and turning knob being included on the ring for supporting the device to a stand or support.

Figure 13:
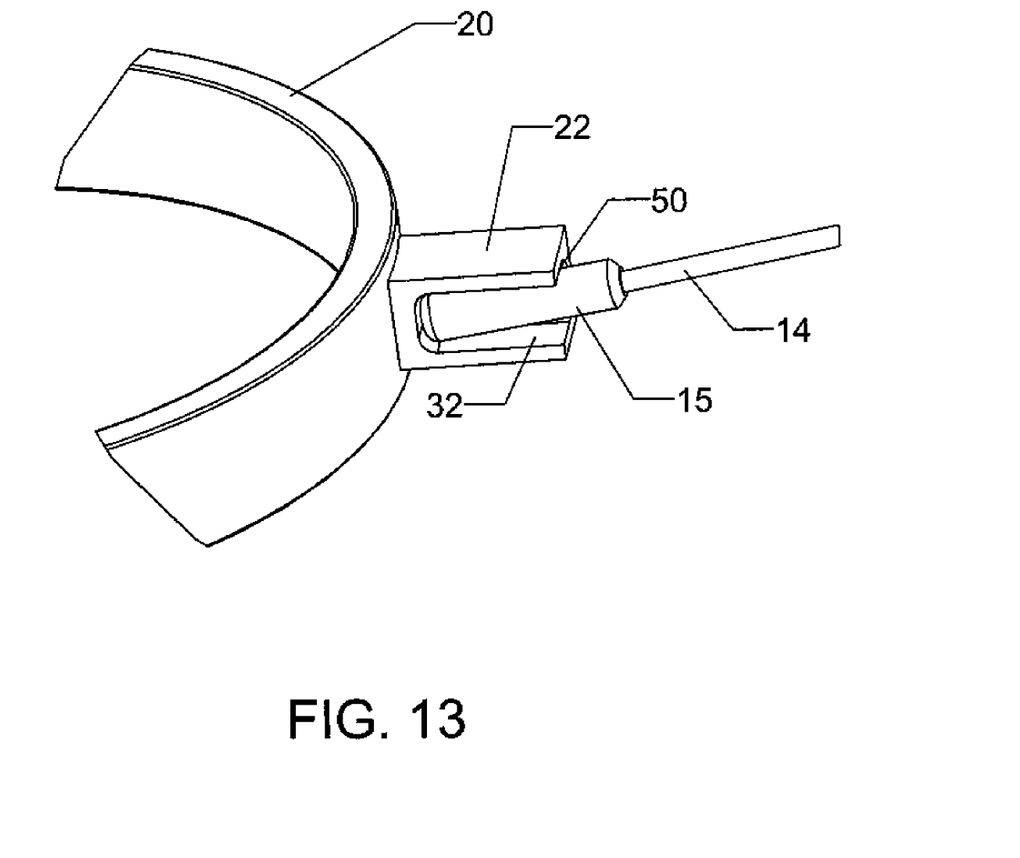
FIG. 13 is a perspective view of a still further embodiment of the invention.

FIG. 13 illustrates an embodiment of the invention where the strut holding device has one or more holding arms 22 that are fixed to a ring forming the hub 20. The holding arm has a cylindrical blind bore that is open to the side to create a passage 32 for entry of the end 15 of the strut 14, which may be enlarged as shown, or may be a simple terminal end of the strut 14 with no enlargement. The seat for the strut end is the blind end of the bore in arm 22, and the hook 50 is the point of contact with the top of the strut end 15. The fulcrum distance is the distance between this seat and the contact point or hook 50 and the vertical distance is the difference between the diameter of strut end 15 and the diameter of the passage 32. Both can be selected to create the desired bend and tension in strut 14.

Soft boxes or other flexible walled structures that can be used with the present invention have at least two struts (to create a two-dimensional surface) and up to any number, but usually 4, 6 or 8 struts for a box or polygon shape.

The struts are usually made of spring steel but can be fiberglass or other flexible resilient material (e.g. music wire).

While specific embodiments of the invention have been shown and described in detail to illustrate the application of the principles of the invention, it will be understood that the invention may be embodied otherwise without departing from such principles.

What is claimed is:

1. A strut holding assembly for use in combination with a plurality of flexible elongated struts that are engaged to a flexible wall and that each have a bent, tensioned position for holding the flexible wall in a use position when a free inner end of each strut is immobilized, the assembly comprising:

a hub;

a plurality of holding arms pivotally connected at spaced locations to the hub, between storage positions adjacent the hub and extended positions extending outwardly of the hub, each holding arm being adapted to immobilize a free inner end of one strut;

at least one of the holding arms comprising:

a seat adapted for receiving and immobilizing the free inner end of a strut in at least one direction; and a hook spaced from the seat by a fulcrum distance, the hook being adapted for engaging the strut at a distance from the free inner end of the strut equal to the fulcrum distance, for immobilizing the strut in its bent, tensioned position in at least three directions and being free to move in a remaining direction.

2. The assembly according to claim 1, wherein the seat and hook are fixed with respect to each other, the at least one holding arm including a passage between the seat and the hook for allowing passage of the strut as it is bent into its tensioned position with the free inner end of the strut immobilized in the seat.

3. The assembly according to claim 1, including a light fixture connected to the hub for carrying a light source for shining light to be modified by a flexible wall engaged to a strut in its tensioned position.

4. The assembly according to claim 1, wherein at least one of the fulcrum distance (X) and a vertical distance (Z) between a center of the seat and a point of contact of the strut against the hook is selected to set a degree of tensioning of the strut in its tensioned position.

5. The assembly according to claim 1, wherein the free end of the strut is immobilized in at least one direction corresponding to a radially inward direction of the hub.

6. The assembly according to claim 1, wherein the strut is immobilized in its tensioned position in at least three directions corresponding to a forward axial direction of the hub, and clock-wise and counter-clock-wise circumferential directions of the hub, and the strut being free to move in a remaining direction corresponding to a rearward axial direction of the hub.

7. The assembly according to claim 1, wherein the free end of the strut is immobilized in at least one direction corresponding to a radially inward direction of the hub, and wherein the strut is immobilized in its tensioned position in at least three directions corresponding to a forward axial direction of the hub, and clock-wise and counter-clock-wise circumferential directions of the hub, and the strut being free to move in a remain direction corresponding to a rearward axial direction of the hub.

8. The assembly according to claim 1, including a strut engaged with the at least one holding arm and a selected flexible wall engaged to the strut, the fulcrum distance (X) changing for changing a bending of the strut in its tensioned position.

9. The assembly according to claim 1, including a strut engaged with the at least one holding arm and a selected flexible wall engaged to the strut, the vertical distance (Z) changing for changing a bending of the strut in its tensioned position.

10. The assembly according to claim 1, wherein the hook is connected to the at least one holding arm by a bridge at one side of the hook, and the hook includes an axial projection at its opposite side.

11. The assembly according to claim 1, wherein the hook is pivotally connected to the at least one holding arm at one side of the hook.

12. A strut holding device for use in combination with a plurality of flexible elongated struts that are engaged to a flexible wall and that each have a bent, tensioned position for holding the flexible wall in a use position when a free inner end of each strut is immobilized, the device comprising:
  a seat adapted for receiving and immobilize the free inner end of a strut in at least one direction; and
  a hook spaced from the seat by a fulcrum distance (X), the hook being adapted for engaging the strut at a distance from the free inner end of the strut equal to the fulcrum distance, for immobilizing the strut in its bent, tensioned position in at least three directions and being free to move in a remaining direction.

13. The device according to claim 12, wherein the seat and hook are fixed with respect to each other, the device including a passage between the seat and the hook for allowing passage of the strut as it is bent into its tensioned position with the free inner end of the strut immobilized in the seat.

14. The device according to claim 12, including a hub connected to the device and a light fixture connected to the hub for carrying a light source for shining light to be modified by a flexible wall engaged to a strut in its tensioned position.

15. The device according to claim 12, wherein at least one of the fulcrum distance (X) and a vertical distance (Z) between a center of the seat and a point of contact of the strut against the hook is selected to set a degree of tensioning of the strut in its tensioned position.

16. The device according to claim 12, wherein the free end of the strut is immobilized in at least one direction corresponding to a radial inward direction of the hub.

17. The device according to claim 12, wherein the strut is immobilized in its tensioned position in at least three directions corresponding to a forward axial direction of the hub, and clock-wise and counter-clock-wise circumferential directions of the hub, and the strut being free to move in a remain direction corresponding to a rearward axial direction of the hub.

18. The device according to claim 12, wherein the free end of the strut is immobilized in at least one direction corresponding to a radial inward direction of the hub, and wherein the strut is immobilized in its tensioned position in at least three directions corresponding to a forward axial direction of the hub, and clock-wise and counter-clock-wise circumferential directions of the hub, and the strut being free to move in a remain direction corresponding to a rearward axial direction of the hub.

19. The device according to claim 12, including a strut engaged with the device and a selected flexible wall engaged to the strut, the fulcrum distance (X) changes for changing a bending of the strut in its tensioned position.

20. The device according to claim 12, including a strut engaged with the device and a selected flexible wall engaged to the strut, the vertical distance (Z) changes for changing a bending of the strut in its tensioned position.

21. The device according to claim 12, wherein the hook is connected to the device by a bridge at one side of the hook, and the hook includes an axial projection at its opposite side.

22. The device according to claim 12, wherein the hook is pivotally connected to the device at one side of the hook.

23. A strut holding device comprising:
  a seat adapted for receiving and immobilize the free inner end of a strut in at least one direction; and
  a hook spaced from the seat by a fulcrum distance (X), the hook being adapted for engaging the strut at a distance from the free inner end of the strut equal to the fulcrum distance, for immobilizing the strut in its bent, tensioned position in a least three directions and being free to move in a remaining direction.

24. The device according to claim 23, including a strut engaged with the device and a selected flexible wall engaged to the strut, the fulcrum distance (X) changes for changing a bending of the strut in its tensioned position.

25. The device according to claim 23, wherein at least one of the fulcrum distance (X) and a vertical distance (Z) between a center of the seat and a point of contact of the strut against the hook is selected to set a degree of tensioning of the strut in its tensioned position.

26. The device according to claim 23, wherein the hook is connected to the device by a bridge at one side of the hook, and the hook includes an axial projection at its opposite side.

27. The device according to claim 23, wherein the hook is pivotally connected to the device at one side of the hook.

* * * * *